No. 617,822. Patented Jan. 17, 1899.
J. M. STUKES.
SPRAYING APPARATUS.
(Application filed Feb. 16, 1898.)
(No Model.) 2 Sheets—Sheet 2.
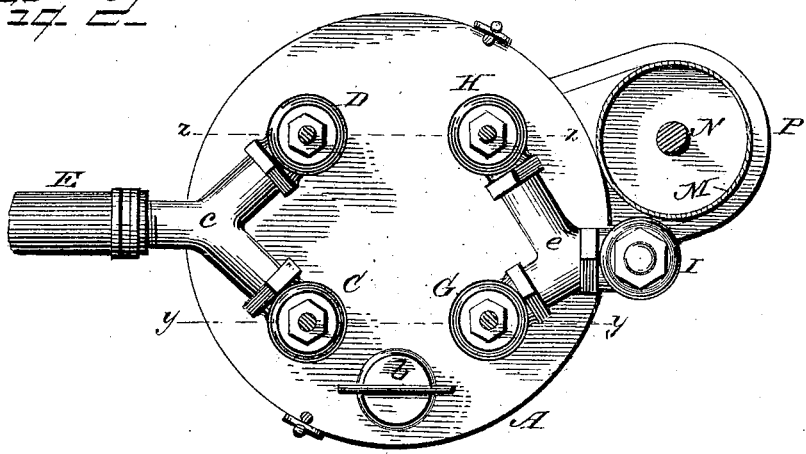
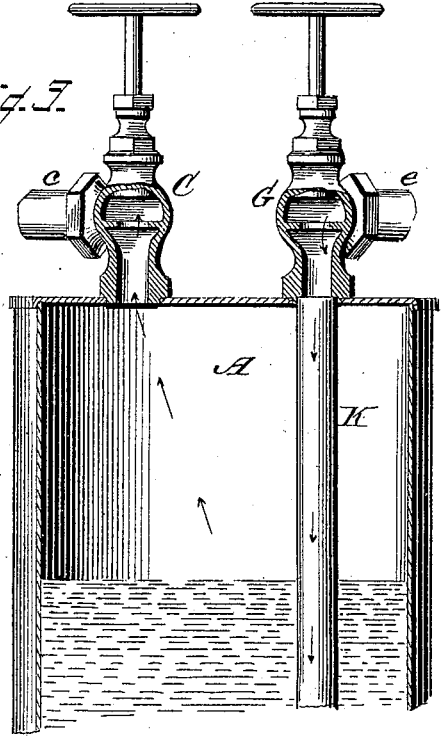
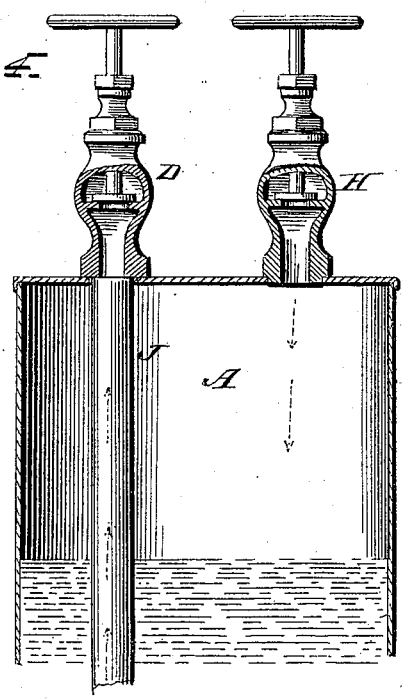
Witnesses
Inventor
John M. Stukes,
per Chas. H. Fowler
Attorney

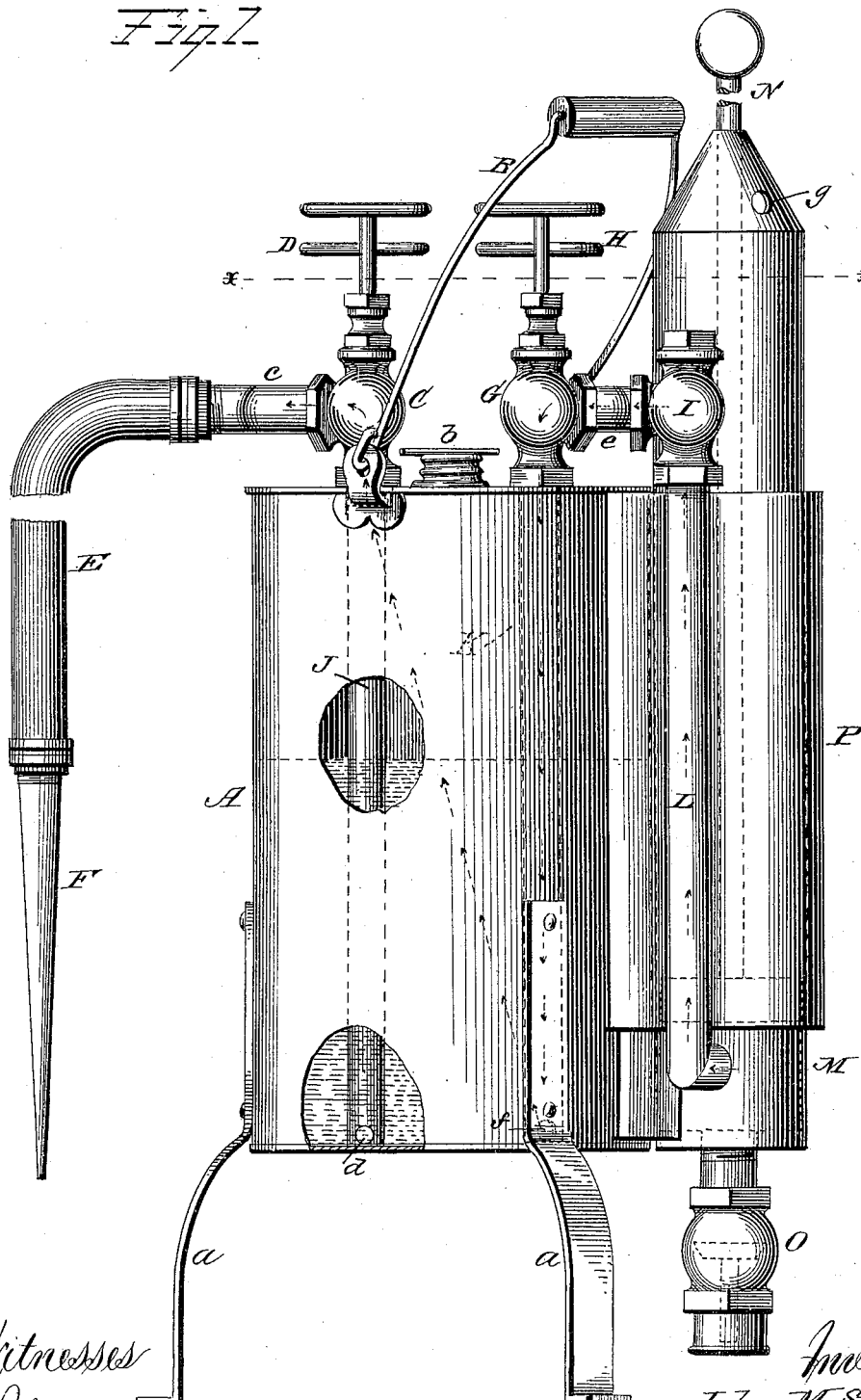

UNITED STATES PATENT OFFICE.

JOHN MARION STUKES, OF SNYDER, TEXAS, ASSIGNOR TO J. A. BEAN, E. K. SMITH, AND NUNN BROTHERS, OF SAME PLACE.

SPRAYING APPARATUS.

SPECIFICATION forming part of Letters Patent No. 617,822, dated January 17, 1899.

Application filed February 16, 1898. Serial No. 670,528. (No model.)

*To all whom it may concern:*

Be it known that I, JOHN MARION STUKES, a citizen of the United States, residing at Snyder, in the county of Scurry and State of Texas, have invented certain new and useful Improvements in Spraying Apparatus; and I do hereby declare that the following is a full, clear, and exact description of the same, reference being had to the annexed drawings, making a part of this specification, and to the letters of reference marked thereon.

The present invention has for its object to provide a simple as well as practical and easily-operating device or apparatus for spraying liquids or throwing a solid stream either with or without chemical compounds for the destruction of insects and small animals or for sprinkling, spraying plants and growing crops, or for any other purposes to which an apparatus of this character may be found useful.

The invention consists in a device or apparatus constructed substantially as shown in the drawings and hereinafter described and claimed.

Figure 1 of the drawings is a side elevation of the apparatus constructed in accordance with my invention, showing the tank partly broken away and the tubes, piston, and check-valve in dotted lines; Fig. 2, a horizontal section taken on line $x\ x$ of Fig. 1; Fig. 3, a sectional elevation taken on line $y\ y$ of Fig. 2; Fig. 4, a similar view taken on line $z\ z$ of Fig. 2.

In the accompanying drawings, A represents a suitable tank for containing the liquid, which tank may be of any desirable construction and of any preferred dimensions. This tank is supported upon suitable legs $a$ and is provided at its top or upper end with a handle or bail B for convenience in carrying it and a suitable opening closed by a screw-cap $b$, through which the tank may be supplied with liquid. The top of the tank has two valves C D communicating with the interior thereof and with a suitable hose E through the branch coupling-pipe $c$. The hose may be of any suitable length and provided with a nozzle F of any of the usual forms found best adapted to the purpose.

The valve C communicates directly with the interior of the tank A at the top thereof, while the valve D has connected therewith a tube J of sufficient length to extend down to the bottom of the tank, and has perforations $d$. Directly opposite the valves C D are valves G H, which communicate with a check-valve I through the medium of a branch coupling-pipe $e$. The valve H, like the valve C, communicates directly with the interior of the tank at the top thereof, and the valve G has a tube K, with which it communicates, said tube extending down to the bottom of the tank, and has perforations, as shown at $f$ in dotted lines of Fig. 1 of the drawings. The check-valve I connects with the upper end of a pipe L, with which it communicates, the lower end of the pipe communicating with the interior of a pump-cylinder M at or near the bottom thereof. This pump-cylinder is provided with the usual piston N, and at its lower end is a suitable check-valve O, the upper end of the cylinder having perforations $g$. The pump-cylinder is attached to the tank A and is shielded by an apron P to preserve the same from injury.

The tank, the several valves, pump-cylinder, and piston may be changed or modified in form and construction without departing from the principle of my invention, and any suitable form of nozzle may be applied to the hose as circumstances require, depending entirely whether used for spraying, sprinkling, or throwing a solid stream.

The tank A being partly filled with the liquid to be used, the valves C G are opened and the valves D H closed, as shown in Figs. 3 and 4 of the drawings, respectively. The piston is now worked in the usual manner of hand-pumps, and at the upward stroke thereof the check-valve O will be forced up off its seat by the pressure of the atmosphere and allow the air to pass into the pump-cylinder below the piston-head. In the downward stroke of the piston the air thus entering the cylinder will be forced up the pipe L and the pressure of the air opening the check-valve I, the air in its course passes through the valve G and down through the tube K and out through the perforations thereof. The air passing up through the fluid from the bottom thereof as it escapes through the perforations in the tube K will agitate the fluid and force it up through the valve C and through the hose E and out through the nozzle F in a fine spray, the course of the air being indicated by the arrows in Figs. 1 and 3 of the drawings. The air being directed with considerable force through the fluid will agitate and vaporize it and therefore will be discharged in a fine spray, which is especially advantageous when the liquid is combined with a chemical compound for the destruction of insects.

When it is desired to discharge the liquid in a solid or unbroken stream for watering or irrigating plants or for other purposes in which a solid stream is desired, the valves C G are closed and the valves D H opened. The pump is now worked as before and the air in the same manner is forced up the pipe L and through the check-valve I and down through the valve H into the tank above the surface of the liquid, as shown in Fig. 4 of the drawings. The pressure of the air above the liquid will force the liquid through the perforations $d$ and up through the tube J and through the valve D and into the hose E, the liquid being discharged through the nozzle F in a solid and unbroken stream.

It will be seen that in the former instance, as indicated in Figs. 1 and 3 of the drawings, the air is forced up through the body of liquid from the bottom thereof to spray the same when discharged through the nozzle, while in the latter instance, as indicated in Fig. 4 of the drawings, the air is forced upon the body of liquid from the top thereof to discharge the liquid through the nozzle in a solid or unbroken stream, the course of the air in the two instances being entirely different.

The apparatus may be used for various purposes where a spray or solid stream is required, and when used for killing small animals—such as the prairie-dog, gopher, salamander, ground-squirrel, mole, &c.—the tank may be partially filled with a solution of bisulfid of carbon or other chemical whose fumes or vapor will kill such animals, the hose and nozzle of the apparatus being placed in the den or burrow of the animal and the liquid forced out through the nozzle.

Having now fully described my invention, what I claim as new, and desire to secure by Letters Patent, is—

1. A spraying apparatus consisting of a suitable tank, an air-pump connecting therewith, tubes located in the tank and having perforations at their lower end, a system of valves connecting with the tubes and with the pump-cylinder whereby the liquid may be discharged in a fine spray or solid stream, and a suitable hose and nozzle connecting with the tank, substantially as and for the purpose set forth.

2. In a spraying apparatus, a suitable tank provided with a hose and nozzle, an air force-pump connected to the tank, a check-valve at the bottom of the pump-cylinder, a pipe connecting with the cylinder at or near its lower end, a check-valve at the upper end of the pipe, valves communicating with the check-valve, one of said valves communicating direct with the interior of the tank at the top thereof and the other valve having a tube extending down to the bottom with perforations at its lower end, a second set of valves communicating with each other and with the hose and with the interior of the tank at the top thereof and with a perforated tube respectively, substantially as and for the purpose described.

In testimony that I claim the above I have hereunto subscribed my name in the presence of two witnesses.

JOHN MARION STUKES.

Witnesses:
A. J. GRANTHAM,
IRA KUTCH.